United States Patent [19]

McQuinn

[11] 4,047,454
[45] Sept. 13, 1977

[54] SHIFT SIGNAL VALVE HYSTERESIS

[75] Inventor: Ted M. McQuinn, Carmel, Ind.

[73] Assignee: General Motors Corporation, Detroit, Mich.

[21] Appl. No.: 551,000

[22] Filed: Feb. 19, 1975

[51] Int. Cl.² .............................................. B60K 21/00
[52] U.S. Cl. ...................................... 74/868; 251/324
[58] Field of Search ................. 74/867, 864, 868, 869; 251/120, 324

[56] References Cited

U.S. PATENT DOCUMENTS

| 3,587,355 | 6/1971 | Schaefer | 74/868 |
| 3,886,819 | 6/1975 | Lentz | 74/868 |

Primary Examiner—Samuel Scott
Assistant Examiner—Frank H. McKenzie, Jr.
Attorney, Agent, or Firm—A. M. Heiter

[57] ABSTRACT

A transmission having a plurality of gear ratios which are selectively engaged on the supply of fluid to a servo motor fluid chamber and controls. The controls have a source of fluid under regulated pressure selectively connected by a relay valve respectively in a first and a second position to a first and a second servo motor to provide a first and a second ratio drive, an automatic shift valve controlled by speed and torque demand for shift movement between a first and a second position having spaced lands slidably sealed in a bore and a smaller intermediate restricting portion providing a restricted passage between the bore and restriction portion operative in the first position to restrictively connect the actuator chamber of the relay valve so the relay valve is in first position and in the second position to restrictively connect said source to the actuator chamber of the relay valve to shift the relay valve to second position.

7 Claims, 2 Drawing Figures

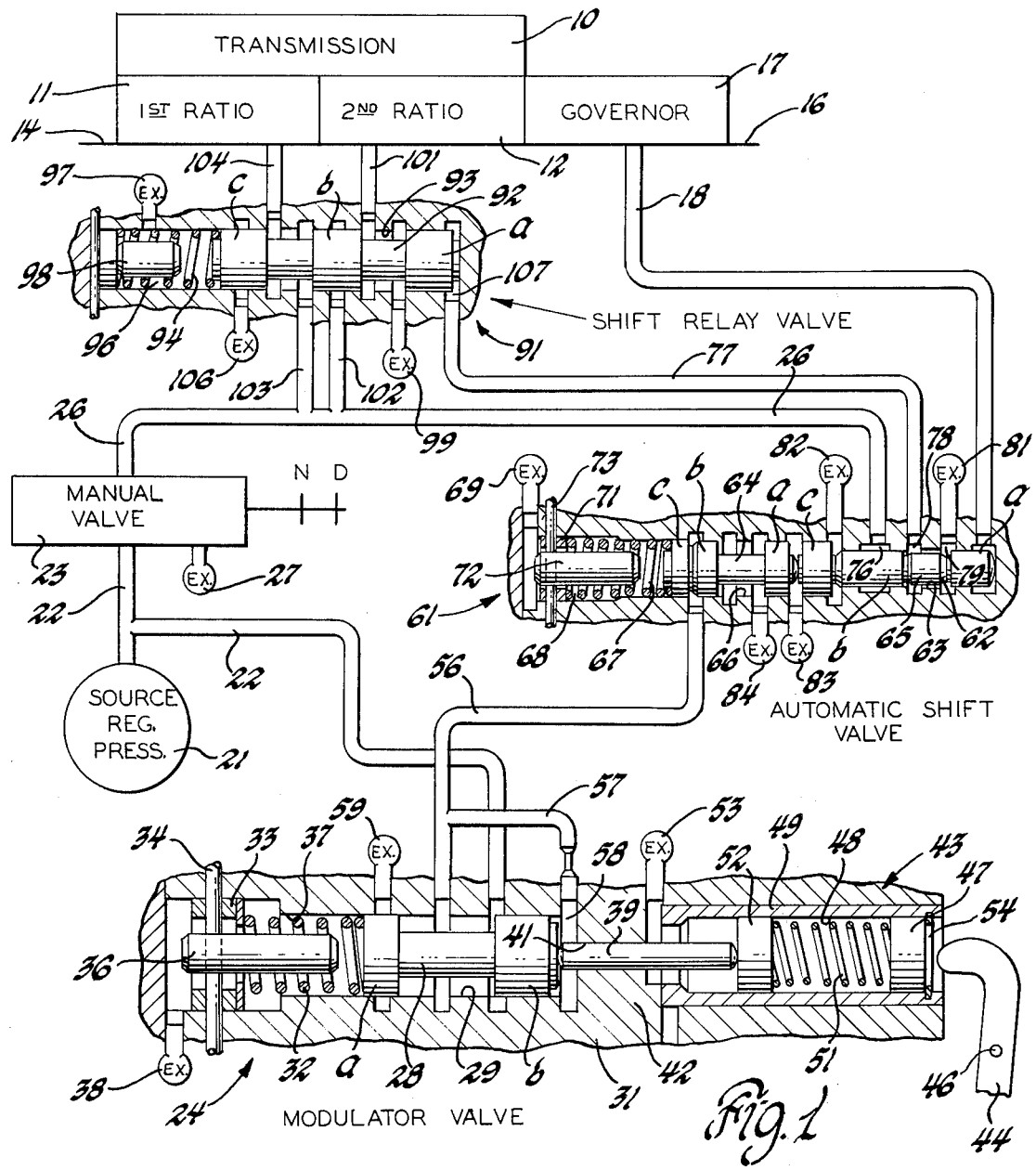
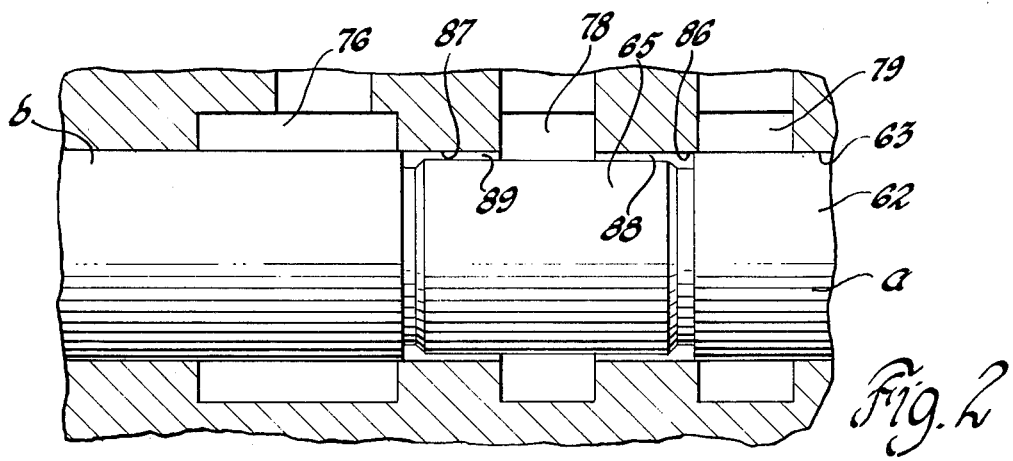

SHIFT SIGNAL VALVE HYSTERESIS

SUMMARY OF INVENTION

This invention relates to transmissions and controls and particularly to damping an automatic shift control.

The invention is used in multi-ratio transmissions having a plurality of fluid pressure operated friction drive establishing devices having a large fluid chamber selectively supplied with fluid under pressure to establish a low and a high speed ratio drive. The control system includes a relay valve having a relay valve element movable between a downshift position and an upshift position and operative to selectively control the supply of fluid pressure from a source to selected fluid pressure operated drive establishing devices in downshift position to establish the low speed ratio drive and in upshift position to establish the high speed ratio drive. The relay valve element is normally biased to downshift position and a fluid actuator device having a small fluid chamber is operable on the supply of a small volume of shift signal fluid pressure to the filled small fluid chamber to upshift the relay valve. An automatic shift valve is operatively controlled by a speed governor signal and a torque demand signal for automatic shifting between an upshift or high position and a downshift or low position. The automatic shift valve has spaced lands slidably fitting the bore and an intermediate portion having a slightly smaller diameter than the lands and bore to provide a highly restricted passage between the intermediate portion and bore connecting the ports. The supply of shift signal pressure to the actuator and the exhaust of shift signal pressure from the actuator is restricted to damp relay valve operation. The shift valve ports are in underlap relation to damp relay valve operation.

These and other features of the invention will be apparent from the following specification and drawings.

FIG. 1 is a schematic of the transmission and control system.

FIG. 2 is a partial enlargement of the automatic shift valve to show the preferred main feature.

Referring to FIG. 1, the transmission 10 is a conventional multi-gear ratio transmission having a plurality of fluid operated ratio establishing devices, such as a first or low ratio device 11 and a second or high ratio device 12. These devices are selectively engaged alone or with other devices to selectively establish a first ratio drive and a second ratio drive between input shaft 14 and output shaft 16. A conventional governor 17 driven by output shaft 16 supplies a governor signal pressure directly proportional to output speed to governor pressure line 18. Such transmissions are shown in a simple two speed example in U.S. Pat. No. 3,587,355 Schaefer patented June 28, 1971 and in a more complex five speed example in U.S. Pat. No. 3,691,872 Schaefer et al patented Sept. 19, 1972.

The control system has a source of regulated fluid pressure 21 to supply a main line 22 which is connected to the manual valve 23 and the modulator valve 24. The manual valve for illustration of this invention in the neutral position blocks main line 22 and connects drive line 26 to exhaust 27 and in the drive position connects main line 22 to drive line 26. The above U.S. Pat. Nos. 3,587,355 and 3,691,872 shows examples of these conventional portions of the controls and show other features that may be used with these controls.

The inverted modulator valve 24 provides a pressure inversely proportional to torque demand. Modulator valve 24 has a valve element 28 having equal diameter lands $a$ and $b$ located in a bore 29 in body 31. The valve element is biased in a pressure increasing direction by a biasing spring 32 which engages land $a$ and seats against a spring seat 33 held in place by fastener pin 34 which also supports a stop pin 36 which prevents excessive movement of the valve element, excessive compression of the spring and guides the spring coils to keep them aligned. The spring chamber portion 37 of bore 29 is vented by exhaust 38. Land $b$ at the other end of the valve engages a force transmitting strut or pin 39 which is reciprocally and sealably mounted in a bore 41 in the end wall 42 at the end of bore 29.

The mechanical actuator 43 has a lever 44 moved from zero to full fuel feed or full torque demand positions by a throttle pedal, a diesel fuel feed rack, a fuel feed control actuated by an engine speed governor, a speed control of a fuel feed governor or other torque demand control devices. The lever 44 is pivoted by pivot 46 and engages plug 47 slidable in bore 48 in sleeve 49 fixed in the body to compress spring 51 and act through slidable plug 52 on pin 39. Bore 48 is vented by exhaust 53. Snap ring 54 fixed in sleeve 49 limits torque demand decreasing movement by plug 47 under the bias of spring 51 in the position shown.

The plugs 47 and 52 slide in bore 48 but are not sealed. Modulator pressure line 56 is connected to the bore 29 between lands $a$ and $b$ of valve element 28 and to modulator restricted branch 57 which is connected to bias chamber 58 to act on land $b$ and pin 39. For regulation, valve element 28 moves between a pressure increasing position connecting main line 22 to modulator line 56 and blocking exhaust 59 and a pressure decreasing position blocking main line 22 and connecting modulator line 56 to exhaust 59. At zero throttle or fuel feed the lever 44 is spaced from plug 47, so strong spring 32 provides a large force and extended spring 51 provides a zero or small force providing a net spring force balancing maximum modulator pressure in chamber 58 to deliver maximum modulator pressure to line 56. At zero throttle the lever 44 has a small clearance, so the lever moves through a very small clearance or tolerance movement maintaining constant maximum modulator pressure. Then lever 44 engages plug 47, and with continued movement of the lever the plug 47 is moved to compress and increase the force of spring 51. The increasing force of spring 51 delivered through plug 52 and pin 39 to valve element 28 oppose spring 32 to reduce the net spring force and modulated pressure to zero just prior to full throttle.

THE ONE-TWO SHIFT SIGNAL VALVE

The 1-2 shift signal valve 61 has a shift valve element 62 having lands $a$, $b$ and $c$ located in a stopped bore 63 and a control valve element 64 having lands $a$, $b$ and $c$ in a stepped bore 66. The lands of both valve elements have sequentially increasing diameters from $a$ to $c$. The shift valve element 62 has between lands $a$ and $b$ a flow restricting portion 65 having a diameter slightly smaller than the bore 63 to damp valve operation as explained in detail below. Both valve elements are biased to the downshift position by a spring 67 located in a spring chamber 68 vented by exhaust 69. The spring is seated on seat 71 and having a valve stop and spring guide pin 72 secured by a fastener 73 to the body. In the downshift position, shift valve element 62 blocks drive port 76 of drive line 26 and connects the 1-2 shift signal line 77 and port 78 to exhaust port 79 and exhaust 81. In this position, governor pressure in chamber 78 acting on land a of valve element 62 and modulator pressure from line 56 acting on the land c of control valve element 64 provide a force in the upshift direction against the downshift direction force of spring 67. When governor and modulator pressure overcome the spring force, both valve elements upshift. In upshift position land a of shift valve element 62 blocks exhaust port 79, drive line 26 from its port 76 is connected to the 1-2 shift signal port 78 and line 77 and drive line pressure between lands a and b acts on the larger area of land b to provide a primary additional upshift hysteresis force. In addition, modulator pressure also acts on land b of control valve element 64 to provide an additional upshift force causing downshifts at lower speeds. The exhaust 82 vents the valve bore between lands 62b and c. The space between the shift valve element 62 and control valve element 64 is in the downshift position shown vented by exhaust 83 and in the upshift position vented by exhaust 84. The space between lands a and b control valve element 64 is in the downshift position vented by exhaust 84 and in the upshift position connected to modulator line 56. Hold or detent pressure may be connected to exhausts 83, 84 as shown in the above U.S. Pat. Nos. 3,587,355 and 3,691,872 if manual hold or detent operation is desired.

FIG. 2 shows the details of the automatic shift valve element 62 in stopped bore 63, the underlap relation of the ports, the differential area lands a and b of the valve element and flow restricting intermediate portion 65 between lands a and b which function to damp automatic shift valve operation and the combined operation of the automatic shift valve 24 and delay valve 91. The bore 63 has a small portion 86 extending from one edge of centrally located shift signal port 78 of shift signal line 77 to the end of the bore. Land 62a slidably and sealably fits this small bore portion. The bore 63 also has a slightly larger bore portion 87 extending from the opposite edge of shift signal port 78. Land 62b slidably and sealably fits in this large bore. The difference in area of lands 62a and b is small, i.e., 0.007 sq.in. The restricted flow passage or exhaust restriction 88 in downshift position from shift signal port 78 between intermediate portion 65 and small bore portion 86 to exhaust port 79 is small, i.e., 0.090 sq.in. The restricted flow passage or feed restriction 89 in upshift position from drive port 76 between intermediate portion 65 and larger bore portion 87 is only slightly larger, i.e., 0.125 sq.in. The lands 62a and b have an underlap relative to drive port 76 and exhaust port 79 since the distance between lands 62a and b is slightly less than the distance between the adjacent edges of drive port 76 and exhaust port 79 to provide a small underlap distance, i.e., 0.008 to 0.010 in, during which there is a trapped volume between lands 62a and b, intermediate portion 65 and bore 63.

ONE-TWO RELAY VALVE

The 1-2 relay valve 91 has a valve element 92 having equal diameter lands a, b and c located in a bore 93 and is biased by a spring 94 to the first position shown in FIG. 1. The spring is located in the chamber 96 vented by exhaust 97 and seated on a seat and valve stop assembly 98. When the valve element 93 is biased to the first position shown by the spring, exhaust 99 is connected between the lands a and b to the second ratio line 101, drive line 26 has a branch 102 blocked by the land b and a branch 103 connected between lands b and c to the first ratio line 104 to engage first ratio and the exhaust 106 blocked by land c. When the 1-2 shift signal valve 61 provides a signal pressure in the 1-2 shift signal line 77 to the small volume chamber 107, this pressure acts on land a moving the valve element to the second ratio position. Then exhaust 99 is blocked by land a, drive line 26 is connected by branch 102 to the second ratio line 102 to engage second ratio, branch 103 is blocked by land b and the first ratio line 104 is connected to exhaust 106 to disengage first ratio.

The branches 102, 103 of drive line 26 and exhausts 99, 106 may be restricted and ratio lines 101 and 104 may be connected to trimmer valves as taught in the above U.S. Pat. No. 3,691,872.

OPERATION

When the engine is running the source 21, normally an input driven pump and regulator valve, supplies the main line 22 which is connected to the modulator valve 24 to supply an inverted modulator signal pressure in line 56 in accordance with the torque demand signal provided by lever 44 as explained above. The manual valve 23 in neutral position N exhausts drive line 26 so the shift valve system cannot engage any ratio drive for a positive neutral.

The manual valve 23 in drive position D connects main line 22 to drive line 26 which supplies the automatic shift valve at port 76 and both branches 102, 103 for the shift relay valve 91. At low speeds the spring 67 biases the automatic shift valve element 62 to the downshift position shown against the bias of governor pressure in chamber 78 acting on land 62a and modulator pressure acting on the unbalanced areas of lands 64b and c so the 1-2 shift signal line 77 is connected to exhaust 81. The extended 1-2 shift signal line 77 exhausts chamber 107 of the shift relay valve 91 so the spring 94 biases the relay valve element 92 to the downshift position shown connecting main pressure by drive line 26, branch 103, between lands 92b and c and first ratio line 104 to the conventional fluid operated first ratio establishing device 11 to establish first ratio drive. The second ratio device 12 is connected by second ratio line 101 between lands 92a and b to exhaust 99 to disestablish second ratio drive. As the output speed and thus governor pressure in chamber 78 increase and torque demand increases and the inverted modulator pressure on the unbalanced area of lands 64b and c decrease, these fluid pressure signal forces increase with increasing speed to upshift the automatic shift valve element 62 and control valve element 64 to the upshift position. In the upshift position modulator pressure also acts on the unbalanced area of lands 64a and b so modulator pressure acts on the unbalanced area of lands a and c to provide upshifting at increasing speeds with increasing torque demand and downshifting at lower speeds increasing at a higher rate with increasing torque demand as more fully explained in the above U.S. Pat. No. 3,587,355. These automatic shift valve biasing forces may also be described as a speed governor upshift direction bias force increasing with increasing speed and a torque demand downshift direction bias force which is a net force, the spring force minus modulator pressure acting on a small area to control upshift and minus modulator pressure acting on a larger area to control downshift.

The automatic shift valve 61 with the element in a downshift position connects shift signal line 77 and port 78 between the restricting portion 65 and small bore portion 86, a small exhaust restriction 88 i.e., 0.090 sq.in., providing an exhaust flow path to exhaust port 79 as shown in FIG. 1 to exhaust shift signal line 77 and chamber 107 of relay valve 91. In this exhaust flow path the other portions, the lines and ports, are larger or have a larger flow capacity than restriction 88 so exhaust flow is restricted by exhaust restriction 88. On a speed and torque demand automatic upshift the land 72a closes exhaust port 79 in intermediate positions as shown in FIG. 2. In the short underlap range of movement, i.e. 0.007 in, when both the exhaust port 79 and drive line or pressure supply port 76 are closed, fluid is trapped in a trapped volume between lands 62a and b, intermediate portion 65 and bore 63. Since during this upshift movement the trapped volume increases because the length and thus volume of the trapped volume portion between small bore portion 86 and intermediate portion 65 having a smaller volume per unit of length is decreasing and the length and thus volume of the trapped volume portion between larger bore portion 87 and intermediate portion 65 having a larger volume per unit of length is increasing, there is no trapped fluid resistance to valve upshift movement. As soon as land 62b opens drive port 76 to the space between the lands 62a and b in an initial upshift position main pressure is supplied through the feed or supply restriction 89 between bore portions 87 and intermediate portion 65, i.e., 0.125 sq.in. to provide a supply flow path to shift signal port 28 and line 77 and the pressure acts on the unbalanced area of lands 62a and b to aid upshift to the final upshift position to provide main line hysteresis between the upshift and downshift speeds. In this feed or supply flow path the other portions, the lines and ports, are larger or have a larger flow capacity than restriction 89 so feed or supply flow is restrictedly feed or supply restriction 89. This upshift hysteresis is provided very quickly, as soon as the opening of port 76 by land 62b is larger than the feed restriction 89 between bore portion 87 and intermediate portion 65 so there is a pressure build up against the differential area between land 62b and intermediate portion 65 for hysteresis force substantially as soon as flow commences and before the pressure rise in the downstream shift signal port 78, line 77 and chamber 107 causes normal main line hysteresis. When the speed, torque demand and main line hysteresis forces cause a downshift the valve element land 62b closes pressure port 76 before exhaust port 79 is opened by land 62a, and thus enters the intermediate trapped volume range of movement. On a downshift the trapped volume decreases because the larger volume per unit of length portion between intermediate portion 65 and larger bore portion 87 is decreasing and the smaller volume per unit of length portion between intermediate portion 65 and smaller bore portion 86 is increasing causing a trapped volume resistance to valve movement during the shoft underlap distance, i.e., 0.007 in, to delay downshift to reduce hunting or damp oscillation. The release of hysteresis is delayed during a downshift, since the spring actuated downshifting relay valve 91 delivers the different volume of chamber 107 under an intermediate pressure through shift signal line 77, port 78, the exhaust restriction 88 between intermediate portion 65 and bore portion 86 to exhaust port 79 provides higher pressure, but less than main line, upstream of the exhaust restriction 88 to act on the differential area of land 62b and intermediate portion 65 to delay dropping hysteresis during exhaust flow during a downshift.

Thus flow hysteresis is provided on the automatic shift valve earlier on an upshift before the full pressure rise in the downstream shift signal line and actuator chamber, and later on a downshift, after the pressure begins to fall in the downstream shift signal line and actuator chamber, than normal main line hysteresis for a longer or extended hysteresis time period, the sum of the flow hysteresis and the normal static main line pressure hysteresis for increased automatic shift valve stability. Thus in addition to the normal main line pressure hysteresis which occurs when line pressure equalizes between the lands, flow hysteresis is provided when there is flow due to the changed volume of the downstream actuator chamber of the relay valve during relay valve movement so there is automatic shift valve hysteresis beginning with upshift movement of the relay valve during automatic shift valve upshift movement, normal main line hysteresis on the automatic shift valve when the relay valve is upshifted and terminating as the relay valve completes its downshift. Then the shift chamber 107, line 77 and port 78 is connected by a smaller restriction 88 i.e., 0.090 sq.in., to the exhaust port 79 to exhaust the small differential volume of fluid from chamber 107 for a downshift.

The shift relay valve 91 is normally biased by spring 94 when chamber 107 is exhausted to the downshift position shown connecting main pressure supplied by drive line branch 103 to first ratio line 104 and the conventional large volume chamber with a large differential volume of the fluid operated first ratio driven device 11 to establish first ratio drive. When the automatic shift valve 61 upshifts since the shift signal line 77 and chamber 107 is filled, the supply of the small differential volume of fluid to chambber 107 will upshift relay valve 91 to connect main pressure in drive line branch 102 to second ratio line 101 and device 12 which has a similarly large differential volume as compared to chamber 107. The restricted fluid supply to shift signal line 77 and restricted exhaust from line 77 by the automatic shift valve for controlling the relay valve damp the operation of both valves for stable shift control operation without objectionable oscillation and hunting caused by operation of the relay valve in response to pressure spikes and provide improved positive snap action shifting.

The above described preferred embodiment of this transmission and control system is illustrative of the concept which may be used in modified form.

It is claimed:

1. A multi-ratio transmission having a plurality of fluid pressure operated friction drive established means having a large fluid chamber selectively established to provide a low and a high speed ratio drive; a source of fluid at a regulated pressure; governor means connected to said transmission providing a governor signal varying with transmission speed; torque demand means providing a torque demand signal varying with torque demand; control means including relay valve means operatively connected to said source and a fluid pressure operated friction drive establishing means and normally biased to low position to establish low drive and having actuator means responsive to shift signal pressure for upshift to high position to establish high drive; automatic shift valve means operatively connected to said governor means, said torque demand means and said source having a bore and a shift valve element mounted for movement in said bore between an upshift position and a downshift position and governor and torque demand responsive means responsive to said governor signal and said torque demand signal to upshift said shift valve element from said downshift position to said upshift position at speeds increasing with increasing torque demand and to downshift said shift valve element from said upshift position to said downshift position at lower speeds, said bore of said automatic shift valve means having a large diameter bore portion and a slightly smaller diameter bore portion with a step therebetween, a shift signal port at said step connected to supply shift signal pressure to said actuator means, a source port in said large diameter bore portion and an exhaust port in said small diameter bore portion, said shift valve element having a large land fitting said large diameter bore portion, a small land fitting said small diameter bore portion and an intermediate portion slightly smaller than said small diameter bore portion to provide a highly restricted passage located and restricting flow between said signal port and said exhaust port and between said signal port and said main port to damp changes in said shift signal pressure to damp relay valve operation and for extended automatic shift valve hysteresis.

2. A multi-ratio transmission having a plurality of fluid pressure operated friction drive established means selectively established to provide a low and a high speed ratio drive; a source of fluid at a regulated pressure; governor means connected to said transmission providing a governor signal varying with transmission speed; torque demand means providing a torque demand signal varying with torque demand; control means including relay valve means operatively connected to said source and a fluid pressure operated friction drive establishing means and normally biased to low position to establish low drive and having actuator means responsive to shift signal pressure for upshift to high position to establish high drive; automatic shift valve means operatively connected to said governor means, said torque demand means and said source having a bore and a shift valve element mounted for movement in said bore between an upshift position and a downshift position and governor and torque demand responsive means responsive to said governor signal and said torque demand signal to upshift said shift valve element from said downshift position to said upshift position at speeds increasing with increasing torque demand and to downshift said shift valve element from said upshift position to said downshift position at lower speeds, said bore of said automatic shift valve means having a large diameter bore portion and a slightly smaller diameter bore portion with a step therebetween, a shift signal port at said step connected to supply a shift signal pressure to said actuator means, a source port in said large diameter bore portion and an exhaust port in said small diameter bore portion, said shift valve element having a large land fitting said large diameter bore portion, a small land fitting said small diameter bore portion, said lands being spaced apart a distance slightly less than the space between said main port and said exhaust port for underlap operation and an intermediate portion slightly smaller than said small diameter bore portion to provide a restricted passage located and restricting flow between said signal port and said exhaust port and between said signal port and said main port to provide extended hysteresis and damp changes in said shift signal pressure to damp relay valve operation and said highly restricted passage between said signal port and said exhaust port damping the initial downshift movement during the underlap operating phase of the automatic shift valve means.

3. A multi-ratio transmission having a plurality of fluid pressure operated friction drive established means having a large fluid chamber selectively established to provide a low and a high speed ratio drive; a source of fluid at a regulated pressure; governor means connected to said transmission providing a governor signal pressure varying with transmission speed; torque demand means providing a torque demand signal pressure varying with torque demand; control means including relay valve means operatively connected to said source and a fluid pressure operated friction drive establishing means having a relay valve element movable between a downshift position and an upshift position and operative to selectively control the supply of fluid pressure from said source to selected fluid pressure operated drive establishing means in said downshift position to establish said low speed ratio drive and in said upshift position to establish said high speed ratio drive and having biasing means connected to said relay valve element to normally bias said relay valve element to downshift position and fluid actuator means having a small differential volume fluid chamber operable on the supply of a small volume of shift signal fluid pressure to the filled small fluid chamber to upshift said relay valve means; automatic shift valve means operatively connected to said governor means, said torque demand means and said source having a bore and a shift valve element mounted for movement in said bore between an upshift position and a downshift position and governor and torque demand responsive means responsive to said governor signal and said torque demand signal to upshift said shift valve element from said downshift position to said upshift position at speeds increasing with increasing torque demand and to downshift said shift valve element from said upshift position to said downshift position at lower speeds, said bore of said automatic shift valve means having a large diameter bore portion and a slightly smaller diameter bore portion with a step therebetween, a shift signal port at said step connected to supply a shift signal pressure to said fluid chamber, a source port in said large diameter bore portion and an exhaust port in said small diameter bore portion, said shift valve element having a large land fitting said large diameter bore portion, a small land fitting said small diameter bore portion, said lands being spaced apart a distance slightly less than the space between said main port and said exhaust port for underlap operation and an intermediate portion slightly smaller than said small diameter bore portion to provide a highly restricted passage located and restricting flow between said signal port and said exhaust port and between said signal port and said main port to provide extended hysteresis, to damp changes in said shift signal pressure to damp relay valve operation and said highly restricted passage between said signal port and said exhaust port damping the initial downshift movement during the underlap operating phase of the automatic shift valve means.

4. In a transmission: multi-ratio transmission means having fluid operated means for establishing low and high ratio drives; a source of regulated pressure fluid; transmission speed governor and torque demand means operatively connected to said multi-ratio transmission means for providing a governor speed signal proportional to transmission speed and a torque demand signal proportional to torque demand; shift control means operatively connected to said fluid operated means for establishing said low and high ratio drives and to said source and having automatic shift valve means operatively connected to said speed governor and torque demand means to automatically upshift said shift valve means from a downshift position to an upshift position at increasing transmission speeds with increasing torque demand and to automatically downshift said shift valve means from said upshift position to said downshift position at lower speeds and operative when said shift valve means is in said downshift position to control said shift control means to establish said low ratio drive and when said shift valve means is in said upshift position to supply shift pressure fluid to said control means to establish said high ratio drive; said shift valve means having a bore with a source port connected to said source; a shift port connected to said shift control means and an exhaust port; shift valve element means in said bore operative in said downshift position of said shift valve means for blocking said source port and connecting said shift port for exhaust flow of shift pressure fluid to said exhaust port and operative in said upshift position of said shift valve means for connecting said source port for shift supply flow of said shift pressure fluid to said shift port and for blocking said exhaust port; and hysteresis means in said bore and on said shift valve element means including supply flow hysteresis means responsive to said supply flow of said shift pressure fluid from said source port to said shift port, static pressure hysteresis means responsive to static pressure of said shift pressure fluid, and exhaust flow hysteresis means responsive to said exhaust flow of said shift pressure fluid from said shift port to said exhaust port each for providing a hysteresis force in an upshift direction on said shift valve element means respectively while upshifting, while in upshift position, and while downshifting.

5. The invention defined in claim 4, and the distance between said second source port and said second exhaust port being less than the distance between said lands for underlap operation permitting free upshift movement and retarding downshift movement.

6. The invention defined in claim 4, and said flow pressure differential land area being larger than said static pressure differential land area.

7. In a transmission: multiratio transmission means having fluid operated means for establishing low and high ratio drives; a source of regulated pressure fluid with a source passage; speed governor and torque demand means operatively connected to said multiratio transmission means for providing a governor speed signal proportional to transmission speed and a torque demand signal proportional to torque demand; shift control means operatively connected to said fluid operated means for establishing said low and high ratio drives and to said source and having a shift passage; automatic shift valve means operatively connected to said shift control means and to said speed governor and torque demand means to automatically upshift said shift valve means from a downshift position to an upshift position at increasing transmission speeds with increasing torque demand and to automatically downshift said shift valve means from said upshift position to said downshift position at lower transmission speeds and operative when said shift valve means is in said downshift position to control said shift control means to establish said low ratio drive when said shift valve means is in said upshift position to supply shift pressure fluid to said shift passage to control said shift control means to establish said high ratio drive; said shift valve means having a bore having a large diameter portion and a small diameter portion with a step between said portions and having a source port in said large diameter portion connected to said source passage, a shift port at said step connected to said shift passage of said shift control means, and an exhaust port in said small diameter portion and shift valve element means in said bore having a large land in said large diameter portion and a small land in said small diameter portion and a connecting portion between said lands forming a large differential area on said large land and a small differential area on said small land, operative in said downshift position of said shift valve means having said large diameter land blocking said source port and having exhaust flow passage means, which is restricted relative to said shift passage and said exhaust port, connecting said shift port for exhaust flow of said shift pressure fluid to said exhaust port and operative in said upshift position of said shift valve means having supply flow passage means which is restricted relative to said source passage and shift passage connecting said source port for shift supply flow of said shift pressure fluid to said shift port and having said small diameter land blocking said exhaust port; supply flow hysteresis means provided by said supply flow passage means and lands responsive to said supply flow of said shift pressure fluid from said source part to said shift port to provide a higher pressure acting on said large differential area than on said small differential area to provide an upshift direction hysteresis force on said shift valve element means during upshifing movement; static pressure hysteresis means provided by said lands responsive to static pressure of said shift pressure fluid acting on the differential area between said large and small lands providing an upshift hysteresis force in upshift position; and exhaust flow hysteresis means provided by said exhaust flow passage means and said lands responsive to said exhaust flow of said shift pressure fluid from said shift port to said exhaust port providing a higher pressure acting on said large differential area than on said small differential area to provide an upshift direction hysteresis force on said shift valve means during downshifting movement.

* * * * *

UNITED STATES PATENT AND TRADEMARK OFFICE
CERTIFICATE OF CORRECTION

PATENT NO. : 4,047,454
DATED : September 13, 1977
INVENTOR(S) : Ted M. McQuinn

It is certified that error appears in the above-identified patent and that said Letters Patent are hereby corrected as shown below:

Page 1, after "[54]", and Column 1, line 2, change the title to -- TRANSMISSION SHIFT SIGNAL VALVE HYSTERESIS --.

Column 2, line 56, change "stopped" to -- stepped --.

Column 3, line 3, after "in" insert -- the end --; delete "78";

line 30, change "stopped" to -- stepped --;

line 66, change "93" to -- 92 --.

Column 4, line 10, change "102" to -- 101 --;

line 34, after "in" insert -- the end --; delete "78";

line 47, after "in" insert -- the end --; delete "78".

Column 5, line 9, change "72a" to -- 62a --;

line 30, change "28" to -- 78 --;

line 36, change "restrictedly" to -- restricted by --.

Column 6, line 30, change "driven" to -- drive --;

line 51, change "established" to -- establishing --.

Column 7, line 25, change "established" to -- establishing --.

UNITED STATES PATENT AND TRADEMARK OFFICE
CERTIFICATE OF CORRECTION

PATENT NO. : 4,047,454
DATED : September 13, 1977
INVENTOR(S) : Ted M. McQuinn

It is certified that error appears in the above–identified patent and that said Letters Patent are hereby corrected as shown below:

Column 8, line 4, change "established" to -- establishing --.

Column 10, line 40, change "part" to -- port --.

Signed and Sealed this

Twenty-first Day of February 1978

[SEAL]

Attest:

RUTH C. MASON
Attesting Officer

LUTRELLE F. PARKER
Acting Commissioner of Patents and Trademarks